United States Patent
Hsieh et al.

(10) Patent No.: US 12,406,653 B2
(45) Date of Patent: Sep. 2, 2025

(54) CUSTOMIZING TEXT-TO-SPEECH LANGUAGE MODELS USING ADAPTERS FOR CONVERSATIONAL AI SYSTEMS AND APPLICATIONS

(71) Applicant: NVIDIA CORPORATION, Santa Clara, CA (US)

(72) Inventors: Cheng-Ping Hsieh, La Jolla, CA (US); Subhankar Ghosh, Santa Clara, CA (US); Boris Ginsburg, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 242 days.

(21) Appl. No.: 17/965,708

(22) Filed: Oct. 13, 2022

(65) Prior Publication Data
US 2024/0127788 A1    Apr. 18, 2024

(51) Int. Cl.
*G10L 13/00* (2006.01)
*G10L 17/02* (2013.01)

(52) U.S. Cl.
CPC .............. *G10L 13/00* (2013.01); *G10L 17/02* (2013.01)

(58) Field of Classification Search
None
See application file for complete search history.

(56) References Cited

U.S. PATENT DOCUMENTS

| 7,565,293 B1 * | 7/2009 | Fuhrmann | G10L 13/00 704/270.1 |
| 11,305,796 B1 * | 4/2022 | Shue | B61L 23/04 |
| 2019/0189110 A1 * | 6/2019 | Chintalapati | G06F 40/30 |
| 2022/0310059 A1 * | 9/2022 | Jia | G10L 13/047 |

OTHER PUBLICATIONS

Lo et al., MOSNet: Deep Learning based Objective Assessment for Voice Conversion, INTERSPEECH, Apr. 26, 2019, 5 pages. https://arxiv.org/abs/1904.08352.

* cited by examiner

*Primary Examiner* — Quynh H Nguyen
(74) *Attorney, Agent, or Firm* — Squire Patton Boggs LLP; Sarah Mirza

(57) ABSTRACT

In various examples, one or more text-to-speech machine learning models may be customized or adapted to accommodate new or additional speakers or speaker voices without requiring a full re-training of the models. For example, a base model may be trained on a set of one or more speakers and, after training or deployment, the model may be adapted to support one or more other speakers. To do this, one or more additional layers (e.g., adapter layers) may be added to the model, and the model may be re-trained or updated—e.g., by freezing parameters of the base model while updating parameters of the adapter layers—to generate an adapted model that can support the one or more original speakers of the base model in addition to the one or more additional speakers corresponding to the adapter layers.

19 Claims, 7 Drawing Sheets

CUSTOMIZING TEXT-TO-SPEECH LANGUAGE MODELS USING ADAPTERS FOR CONVERSATIONAL AI SYSTEMS AND APPLICATIONS

TECHNICAL FIELD

Embodiments of the present disclosure relate generally to computer science and machine learning and, more specifically, to customizing text-to-speech models—e.g., for new speakers—using adapters.

BACKGROUND

In machine learning, data is used to train machine learning models to perform various tasks. One type of task that machine learning models can be trained to perform is converting textual inputs to auditory or speech outputs—commonly referred to as text-to-speech (TTS). In some use cases, TTS machine learning models are used to convert textual input (e.g., a string of alpha-numeric characters) into speech sounds that are imitative of human voices.

Conventionally, a TTS machine learning model is trained to generate speech or a proxy thereof, such as spectrograms corresponding to the speech, for a number of speakers. Typically, a TTS machine learning model must be specifically trained to imitate the characteristics (e.g., pitch, intonation, speech patterns, etc.) of a particular speaker's voice. Thus, to customize the TTS machine learning model for a new speaker, the TTS machine learning model needs to be re-trained (e.g., to update parameters of the model) using audio data of the new speaker speaking—which is also referred to herein as "speech data."

One drawback of the above approach for re-training a TTS machine learning model to generate speech corresponding to a new speaker is that the re-training generally requires a large amount of speech data. For example, thirty minutes or more of speech data and a substantial amount of time and compute resources are needed to re-train some TTS machine learning models for a new speaker. Another drawback of the above approach for re-training a TTS machine learning model to generate speech corresponding to a new speaker is the performance of the TTS machine learning model can be degraded when generating speech corresponding to previous speakers for which the TTS machine learning model was trained. As such, to avoid overtraining the model to the new speaker or otherwise degrading the prior performance, the re-training also requires using some or all of the original training audio data corresponding to the one or more original speakers that the model was trained for.

SUMMARY

One embodiment of the present disclosure includes a method. The method includes determining, based at least on identification data corresponding to a speaker, one or more adapters corresponding to the speaker. The method further includes generating a speech representation corresponding to the speaker based at least on processing a textual input using a text-to-speech (TTS) machine learning model and the one or more adapters.

Another embodiment of the present disclosure includes a processor. The processor includes one or more processing units to perform operations including: receiving an input comprising identification data corresponding to a first speaker; activating, based on identification data corresponding to the first speaker, one or more adapters associated with the first speaker and corresponding to a text-to-speech (TTS) machine learning model; processing one or more first textual inputs using the TTS machine learning model and the one or more adapters; and deactivating the one or more adapters during the processing of one or more second textual inputs corresponding to a second speaker different from the first speaker.

Another embodiment of the present disclosure includes a system. The system includes one or more processing units to generate an audio signal corresponding to a speaker based at least on a textual input, the audio signal being generated using an output of a machine learning model that includes one or more adapter layers associated with the speaker.

Other embodiments of the present disclosure include, without limitation, one or more processing units to perform one or more aspects of the disclosed techniques as well as one or more computing systems for performing one or more aspects of the disclosed techniques.

At least one technical advantage of the disclosed techniques relative to the conventional solutions is that a TTS machine learning model can be customized for new speakers using less training data, time, and compute resources. In addition, by fixing parameters of the TTS machine learning model other than the parameters in one or more adapters during training, the performance of the TTS machine learning model for previous speakers is not impacted by the training—e.g., because the adapters may be deactivated or skipped over during processing of speech data corresponding to the speakers the base model is trained for.

BRIEF DESCRIPTION OF THE DRAWINGS

So that the manner in which the above recited features of the various embodiments can be understood in detail, a more particular description of the concepts of the present disclosure, briefly summarized above, may be had by reference to various embodiments, some of which are illustrated in the drawings. It is to be noted, however, that the drawings illustrate only some embodiments of the present disclosure are therefore not to be considered limiting of scope in any way, and that there are other equally effective embodiments.

DETAILED DESCRIPTION

Figure 1:
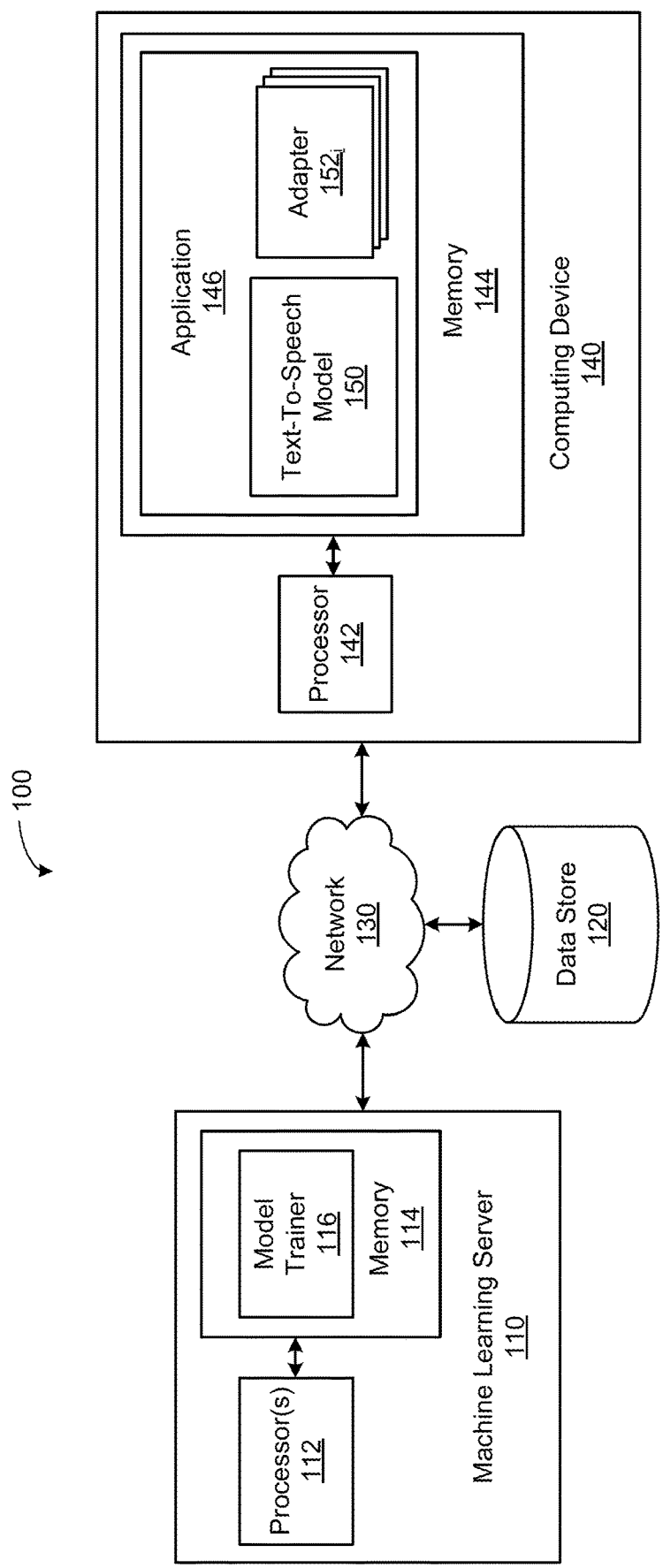
FIG. 1 is a block diagram illustrating a computer system configured to implement one or more aspects of the various embodiments.

In the following description, numerous specific details are set forth to provide a more thorough understanding of the various embodiments. However, it will be apparent to one skilled in the art that the concepts of the present disclosure may be practiced without one or more of these specific details.

General Overview

Embodiments of the present disclosure provide improved techniques for customizing or adapting text-to-speech (TTS) machine learning models. In some embodiments, one or more adapters (e.g., one or more additional or new network layers) are inserted into a TTS machine learning model that was previously trained to generate speech corresponding to one or more speakers. To customize the TTS machine learning model for a new speaker, the TTS machine learning model that includes the one or more adapters is trained using speech data of the new speaker speaking. During the training, in embodiments, parameters (e.g., weights and biases) of the one or more adapters are updated, while other parameters of the TTS machine learning model are fixed or frozen. In some embodiments, an embedding associated with the new speaker is also learned during the training.

After re-training, and once deployed, text and/or an embedding associated with one or more new speakers can be processed via the updated or adapted TTS machine learning model to generate speech data for output (e.g., via a speaker device). To generate speech for other speakers, other adapters that are trained using speech data for the other speakers can be inserted into the TTS machine learning model, and/or the current adapters may be trained for any number of new speakers. As such, each set of one or more adapters may be trained for a single new speaker or for a group of new speakers.

In addition, during inference after training, a speaker identifier may be used to aid in the determination of whether or not to activate or use the adapters in the processing of the text data. For example, where a speaker identifier indicates a speaker that the base model was trained or configured for, the adapters (e.g., the adapter layers of the network) may not be included in the processing of the input (e.g., text) data. As another example, where a speaker identifier indicates a speaker that the adapter(s) were trained or configured for, and that the base model was not trained or configured for, the adapters may be included in the processing of the input (e.g., text) data.

The customized TTS machine learning models disclosed herein may have many real-world applications. For example, those customized TTS machine learning models may be deployed in virtual home assistants. As another example, those customized TTS machine learning models may be used to generate speech for chat bots or digital avatars within kiosks, video games, and/or elsewhere. As a further example, those customized TTS machine learning models may be used to generate speech on websites or applications.

The above examples are not in any way intended to be limiting. As persons skilled in the art will appreciate, as a general matter, the customized TTS machine learning models described herein can be implemented in any suitable application.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational artificial intelligence (AI), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an infotainment or plug-in gaming/streaming system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

System Overview

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), and/or any other suitable network. In some embodiments, the sensors can include one or more RGB (red, green, blue) cameras and/or one or more depth cameras, such as cameras using time-of-flight sensors, LIDAR (light detection and ranging) sensors, etc.

As shown, a model trainer 116 executes on one or more processors 112 of the machine learning server 110 and is stored in a system memory 114 of the machine learning server 110. The processor(s) 112 receive user input from input devices, such as a keyboard or a mouse. In operation, the one or more processors 112 may include one or more primary processors of the machine learning server 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the machine learning server 110 stores content, such as software applications and data, for use by the processor(s) 112 and the GPU(s) and/or other processing units. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor(s) 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

The machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or a GPU(s) can be included in and/or replaced with any type of virtual computing system, distributed computing system, and/or cloud computing environment, such as a public, private, or a hybrid cloud system.

In some embodiments, the model trainer 116 is configured to train one or more machine learning models, including one or more TTS machine learning models 150 or instances or versions thereof. In particular, the model trainer 116 is configured to customize, adapt, or update the TTS machine learning model(s) 150 for new speakers or users by inserting one or more adapters 152 (referred to herein individually as an adapter 152 and collectively as adapters 152)—such as one or more new or additional layers that serve to adapt the model(s) 150—into the TTS machine learning model(s) 150. With the adapters implemented, training may be performed to update one or more parameters (e.g., weights and biases) of the inserted adapters 152 while, in embodiments, parameters of the original or base TTS machine learning model(s) 150 (e.g., layers of the model(s) 150 not corresponding to the adapters) are fixed. As used herein, a "fixed" or "frozen" parameter is a parameter whose value(s) are maintained the same rather than updated. Architectures of the TTS machine learning model 150 and the adapters 152, as well as techniques for training the same, are discussed in greater detail herein in conjunction with at least FIGS. 4-7. Training data and/or trained (or deployed) machine learning models, including the TTS machine learning model(s) 150 and/or the adapter(s) 152, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

As shown, an application 146 that uses the TTS machine learning model 150 and the adapters 152 is stored in a memory 144 (e.g., one or more memory or storage units), and executes on a processor(s) 142, of the computing device 140. Once trained, the TTS machine learning model 150 and the adapters 152 can be deployed to any suitable application, such as a virtual home assistant, a digital avatar, a chat bot, a game, a streaming application, a metaverse or omniverse application, a web application, and/or another type of application that may use synthetic or generated speech (e.g., speech from text).

Figure 2:
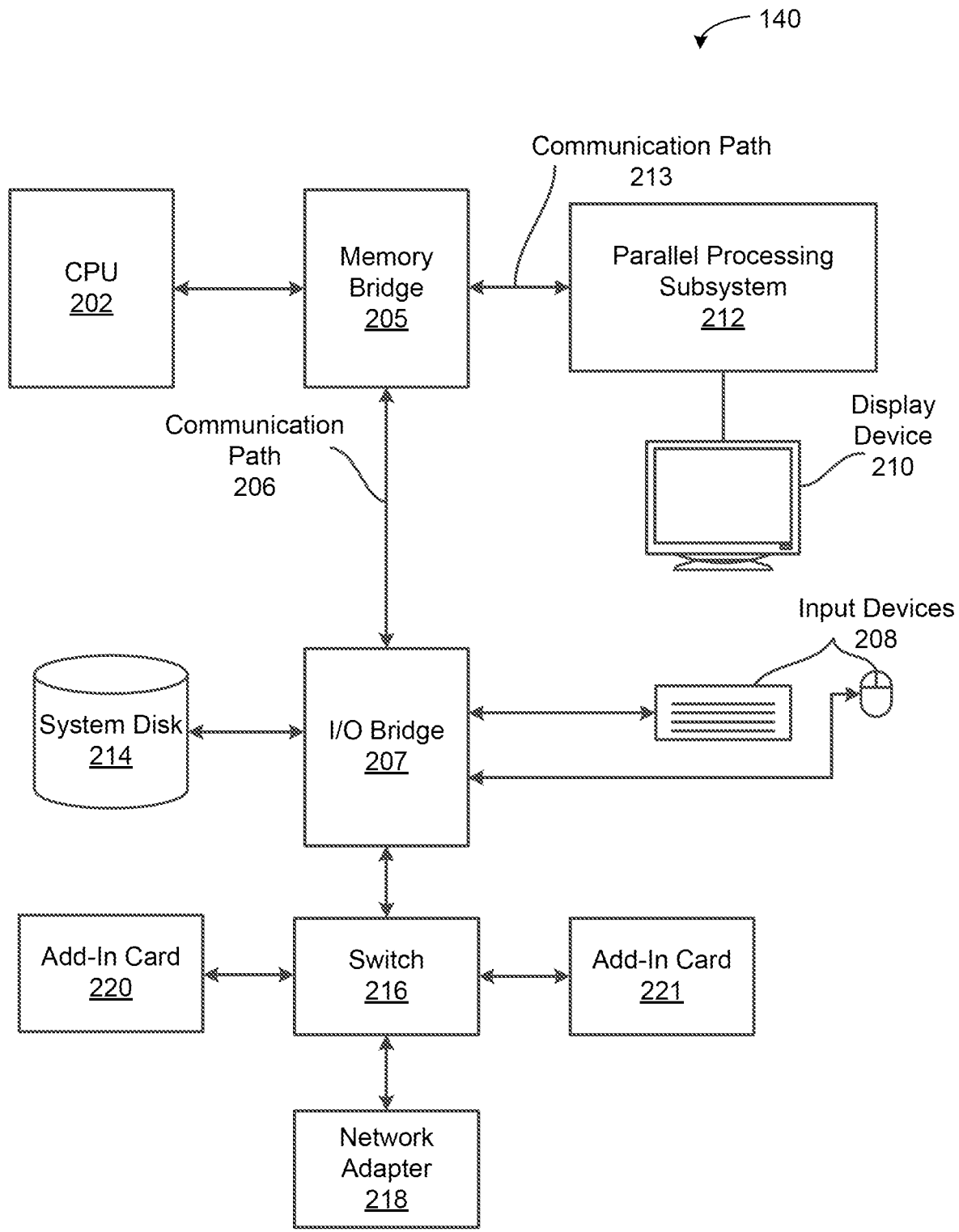
FIG. 2 is a block diagram illustrating the computing device of FIG. 1 in greater detail, according to various embodiments.

FIG. 2 is a block diagram illustrating the computing device 140 of FIG. 1 in greater detail, according to various embodiments. Computing device 140 may include any type of computing system, including, without limitation, a server machine, a server platform, a desktop machine, a laptop machine, a hand-held/mobile device, a digital kiosk, an in-vehicle infotainment system, and/or a wearable device. In some embodiments, computing device 140 is a server machine operating in a data center or a cloud computing environment that provides scalable computing resources as a service over a network. In some embodiments, the machine learning server 110 can include one or more similar components as the computing device 140.

In various embodiments, the computing device 140 includes, without limitation, the processor(s) 142 and the memory(ies) 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, the computing device 140 may be a server machine in a cloud computing environment. In such embodiments, computing device 140 may not include input devices 208, but may receive equivalent input information by receiving commands (e.g., responsive to one or more inputs from a remote computing device) in the form of messages transmitted over a network and received via the network adapter 218. In at least one embodiment, switch 216 is configured to provide connections between I/O bridge 207 and other components of the computing device 140, such as a network adapter 218 and various add-in cards 220 and 221.

In at least one embodiment, I/O bridge 207 is coupled to a system disk 214 that may be configured to store content and applications and data for use by processor(s) 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. As described in greater detail herein in conjunction with at least FIGS. 2-3, such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. System memory 144 includes at least one device driver configured to manage the processing operations of the one or more PPUs within parallel processing subsystem 212. In addition, the system memory 144 includes the application 146. The application 146 can be any technically feasible application that generates speech from text. For example, the application 146 may be a virtual digital assistant, a game, a metaverse or omniverse application, a web application, a chat bot application, a video conferencing application, and/or another type of application. Although described herein primarily with respect to the application 146, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 1 to form a single system. For example, parallel processing subsystem 212 may be integrated with processor 142 and other connection circuitry on a single chip to form a system on a chip (SoC).

In at least one embodiment, processor(s) 142 includes the primary processor of computing device 140, controlling and coordinating operations of other system components. In at least one embodiment, the processor(s) 142 issue commands that control the operation of PPUs. In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 may be connected to the processor(s) 142 directly rather than through memory bridge 205, and other devices may communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 1 may not be present. For example, switch 216 may be eliminated, and network adapter 218 and add-in cards 220, 221 would connect directly to I/O bridge 207. Lastly, in certain embodiments, one or more components shown in FIG. 1 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Customizing Text-to-Speech Language Models for New Speakers Using Adapters

Figure 3:
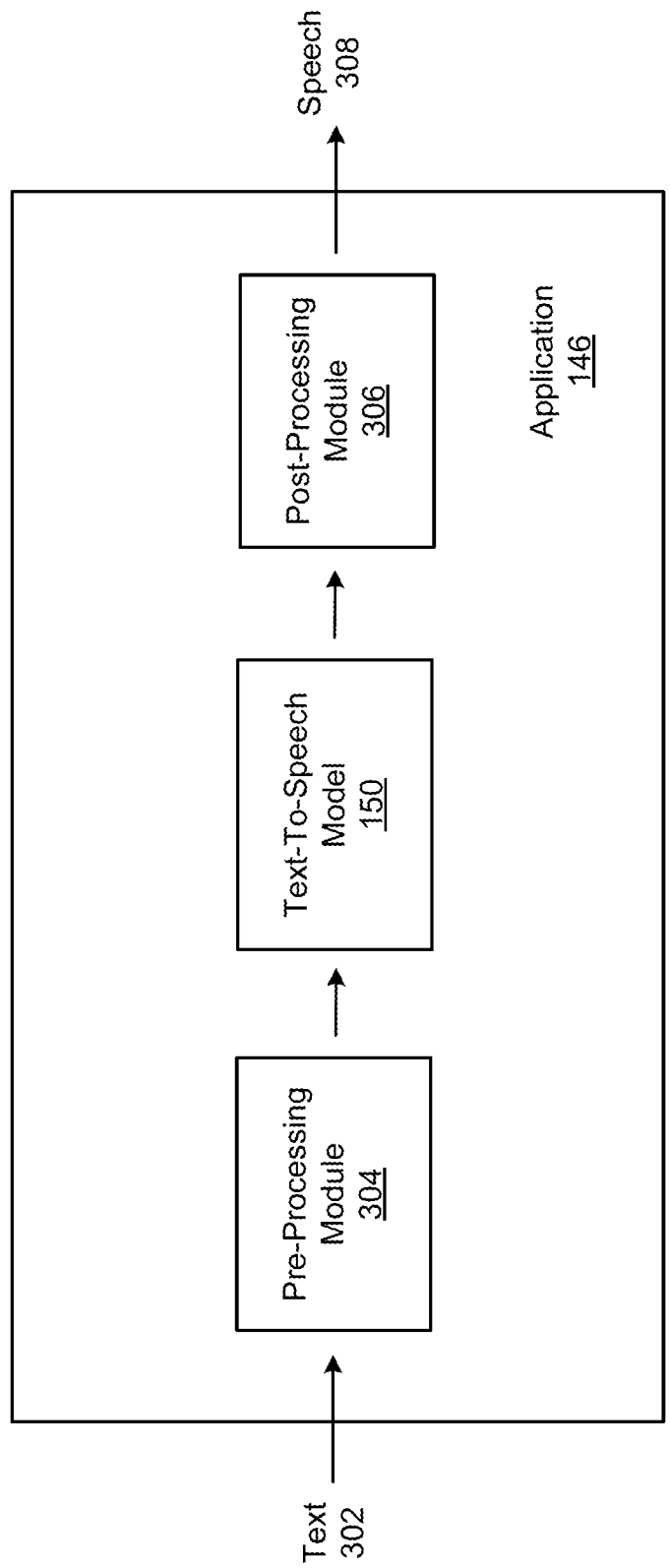
FIG. 3 is a more detailed illustration of the application of FIG. 1, according to various embodiments.

FIG. 3 is a more detailed illustration of the application 146 of FIG. 1, according to various embodiments. As shown, the application 146 includes a pre-processing module 304, the TTS machine learning model(s) 150, and a post-processing module 306. In operation, the application 146 takes as input textual data 302 and/or identification data 303 associated with a speaker. The application 146 outputs a speech 308 audio signal that corresponds to the textual data 302 and, in embodiments, in a voice or tone that corresponds to the speaker associated with the identification data 303. The speech 308 can then be stored, sent to another device, and/or played back or caused to be played back or otherwise output via, for example, a speaker device.

The pre-processing module 304 may convert the textual data 302 to a format that can be input, along with the identification data 303, into the TTS machine learning model(s) 150. The post-processing module 306 may convert an output of the TTS machine learning model(s) 150 to the speech 308 audio signal(s). Any technically feasible pre-processing and/or post-processing can be performed using the pre-processing module 304 and/or the post-processing module 306, respectively. In some embodiments, the particular pre-processing and post-processing that are performed can depend on the TTS machine learning model(s) 150. In some embodiments, no pre-processing and/or post-processing are performed.

Figure 4:
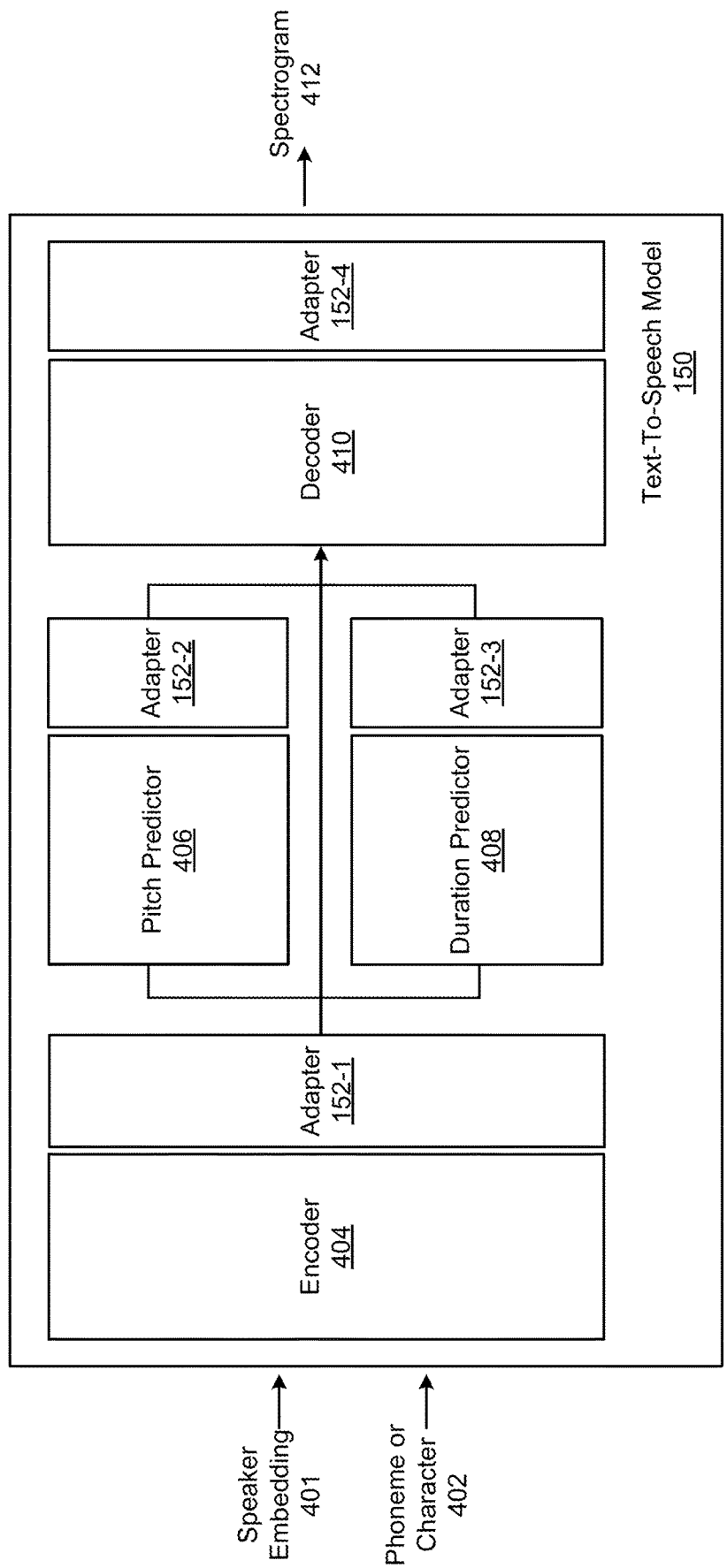
FIG. 4 is a more detailed illustration of one example architecture for the text-to-speech machine learning model of FIG. 3, according to various embodiments.

In some embodiments, the TTS machine learning model(s) 150 takes as input a speaker embedding and textual data (e.g., representative of a phoneme, character, letter, symbol, word, sub-word, etc.), and outputs an audio signal representation (e.g., a spectrogram), as discussed in greater detail herein at least with respect to FIG. 4. In such cases, the identification data 303 can include the speaker embedding, or the application 146 can determine a speaker embedding from the identification data 303. In addition, the pre-processing module 304 may divide the textual data 302 into frames or sub-parts, such as by separating out characters, letters, phonemes, words, sub words, and/or other discrete portions of the textual data, and these portions may be individually applied as input to the TTS machine learning model(s) 150. For example, the pre-processing module 304 may include a normalization weighted finite-state transducer (WFST) that divides the textual data 302 into portions or sub-parts. In addition, the post-processing module 306 may convert the output representation (e.g., a spectrogram, mel-spectrogram, etc.) of the TTS machine learning model(s) 150 to the speech 308. For example, the post-processing module 306 may include a generative adversarial network (GAN) model, such as a VOCODER HiFi-GAN model, that generates audio signals from spectrograms or other audio representations.

FIG. 4 is a more detailed illustration of one example architecture for the TTS machine learning model 150 of FIG. 3, according to various embodiments. As shown, the TTS machine learning model 150 includes an encoder 404, a pitch predictor 406, a duration predictor 408, and a decoder 410. The encoder 404, the pitch predictor 406, the duration predictor 408, and the decoder 410 form a base TTS machine learning model, into which adapters can be inserted. Each of the encoder 404, the pitch predictor 406, the duration predictor 408, and the decoder 410 includes one or more layers of artificial neurons. In some embodiments, the base TTS machine learning model including the encoder 404, the pitch predictor 406, the duration predictor 408, and the decoder 410 is pre-trained using speech data corresponding to one or more speakers.

Illustratively, adapters 152-1, 152-2, 152-3, and 152-4 have been inserted into the TTS machine learning model 150 after the encoder 404, the pitch predictor 406, the duration predictor 408, and the decoder 410, respectively. Each adapter 152-1, 152-2, 152-3, and 152-4 includes one or more layers of artificial neurons. Parameters of the adapters 152-1, 152-2, 152-3, and 152-4, such as weights and biases therein, can be learned during training, as discussed in greater detail herein in conjunction with at least FIGS. 5-6.

In operation, the TTS machine learning model 150 takes as input a speaker embedding 401 and/or a textual- or sound-based input (e.g., a phoneme or character 402, or a sub word, a word, a letter, a token, a symbol, etc.). The speaker embedding 401 may include a vector of values that represents a particular speaker. The speaker associated with the embedding 401 can have a different identity (e.g., correspond to a different person, character, simulated avatar, etc.), a different emotional state (e.g., happy, sad, etc.), and/or a different tone than other speakers. It should be understood that different speakers can speak with different pitches, different speech patterns, different durations of speech, among other things. As described, the identification data 303 can include the speaker embedding 401, in some embodiments. In some other embodiments, the identification data 303 can be in a different format (e.g., an identification number), and the speaker embedding 401 may be determined from the identification data 303. The phoneme or character 402 (and/or as described herein, word, sub word, etc.) may include a portion of a textual input that is generated using the pre-processing module 304. For example, the pre-processing module 304 may divide the textual input into individual phonemes, characters, letters, words, sub words, etc., as described herein at least with respect to FIG. 3. The portions of a textual input can be sequentially input into the TTS machine learning model 150 and, given the speaker embedding 401 and the portion of the textual representation as inputs, the TTS machine learning model 150 may generate an audio representation as an output—e.g., a spectrogram 412. In some embodiments, the spectrogram 412 is a two-dimensional (2D) frequency image that can be converted (using the post-processing module 306) to an audio signal for playback via one or more speaker devices, and/or for storage in memory of one or more devices. In some embodiments the TTS machine learning model 150 may be used in real-time or near real-time deployment, such as in a video game, a streaming application, a video conferencing application, a digital assistant, an in-vehicle infotainment chat bot or digital avatar, a navigation assistant, and/or the like. In some embodiments, speech of a person may be converted to text, and the text may be used by the TTS machine learning model 150 to generate speech in a voice, sound, emotion, etc. of another speaker or a same speaker with another emotion/intonation.

The encoder 404 may encode the portion of the textual input (e.g., the phoneme or character 402) to generate an encoded representation of the portion of the textual input. In some embodiments, the encoder 404 includes a feed-forward transformer block that includes one or more convolutional layers.

The pitch predictor 406 and the duration predictor 408 may receive the encoded representation of the phoneme or character 402 that is output by the encoder 404 as inputs. Different speakers can pronounce phonemes or characters with different pitches. The pitch predictor 406 predicts a pitch associated with the phoneme or character 402 for the speaker associated with the speaker embedding 401. In some embodiments, the pitch predictor 406 outputs the pitch as a numeric value.

In addition, different speakers can pronounce phonemes or characters with different durations. The duration predictor 408 predicts a duration of time associated with the phoneme or character 402 for the speaker associated with the speaker embedding 401. In some embodiments, the duration predictor 408 outputs the duration as a numeric value.

The decoder 410 decodes outputs of the encoder 404, the pitch predictor 406 and the duration predictor 408, and the subsequent adapters 152-1, 152-2, and 152-3, respectively, to generate an audio or speech representation (e.g., a spectrogram 412) that can be converted to a speech audio signal. In some embodiments, the decoder 410 includes a feed-forward transformer block that includes one or more convolutional layers.

The adapters 152-1, 152-2, 152-3, and 152-4 take outputs of the encoder 404, the pitch predictor 406, the duration predictor 408f, and/or the decoder 410, respectively, as inputs and modify those outputs such that the audio or speech output representation (e.g., spectrogram 412) generated using the TTS model 150 corresponds to the speaker associated with the speaker embedding 401. In some embodiments, the adapters 152-1, 152-2, 152-3, and 152-4 are selected for insertion into the TTS machine learning model 150 based on the speaker embedding 401 (or speaker identification data from which the speaker embedding 401 is derived), because the adapters 152-1, 152-2, 152-3, and 152-4 have been trained on speech data for the speaker associated with the speaker embedding 401. Other adapters can be inserted into the TTS machine learning model 150 for other speakers that are associated with other speaker embeddings. Inserting an adapter for use in a TTS machine learning model activates the adapter for use. More generally, in some embodiments, adapters can be activated and/or deactivated in any technically feasible manner based on the speakers for which TTS is to be performed.

Any technically feasible adapters 152-1, 152-2, 152-3, and 152-4 can be used, depending on the embodiment. In some embodiments, the adapters 152-1, 152-2, 152-3, and/or 152-4 include feed-forward adapters with residual connections. For example, in some embodiments, individual adapters 152-1, 152-2, 152-3, and/or 152-4 can have a bottleneck architecture. In such cases, the adapter 152-1, 152-2, 152-3, and 152-4 can include, e.g., a fully connected layer, a feed-forward down-projection module that reduces a dimension of the input, another fully connected layer, a non-linearity module, and/or a feed-forward up-projection module that increases the dimension again.

Although FIG. 4 shows adapters 152-1, 152-2, 152-3, and 152-4 after the encoder 404, the pitch predictor 406, the duration predictor 408, and the decoder 410 for illustrative purposes, in some embodiments, one or more adapters can be inserted after one or more modules of a TTS machine learning model, can be inserted within one or more modules of the model, can be inserted prior to one or more modules, and/or can be inserted elsewhere within the layers of a model. Further, any technically feasible type or types of adapters 152 can be employed in some embodiments. For example, to customize a TTS machine learning model 150 for pitches associated with a particular speaker, an adapter may be inserted after a pitch predictor 406 of the TTS machine learning model 150. As another example, to customize a TTS machine learning model 150 for durations of speech associated with a particular speaker, an adapter 152 may be inserted after a duration predictor 408 of the TTS machine learning model 150.

Although described herein primarily with respect to inserting adapters 152 after modules of the TTS machine learning model 150, in some embodiments, one or more adapters 152 can be inserted at any suitable location or locations within the TTS machine learning model 150, including after, in parallel with, and within one or more modules of the TTS machine learning model 150. In the case of a parallel adapter, an output of the adapter 152 can be merged with the output of a module that the adapter 152 is parallel to. For example, feed-forward adapters with residual connections may be inserted in parallel with an encoder 404, pitch predictor 406, duration predictor 408, and/or decoder 410 of the TTS machine learning model 150. As another example, LoRA (low-rank adaptation) or prefix tuning adapters may be inserted into an encoder, pitch predictor, duration predictor, and/or decoder of a TTS machine learning model. As yet another example, self-attention modules may be used as adapters 152 that are inserted after or in parallel with an encoder 404, pitch predictor 406, duration predictor 408, and/or decoder 410 of the TTS machine learning model 150.

In deployment, the adapter 152 may be activated only for speakers for which the adapters were trained, and may be deactivated when the current speaker corresponds to a base TTS machine learning model. For example, if the base model was trained to generate speech in a voice of a first speaker and a second speaker, and the adapters correspond to a third speaker, when the identification data indicates that the TTS machine learning model 150 is to generate speech for the first speaker, the adapters 152 may be deactivated (e.g., not include in the processing of the text or speech data). As another example, when the identification data indicates that the TTS machine learning model 150 is to generate speech for the third speaker, the adapters 152 may be activated (e.g., included in the processing of the text or speech data). As such, the original performance of the model may be maintained for the original speakers, and the adapters may aid in predicting accurate outputs for new speakers without requiring the TTS machine learning model to be re-trained completely on new speaker data in combination with original speaker data.

Figure 5:
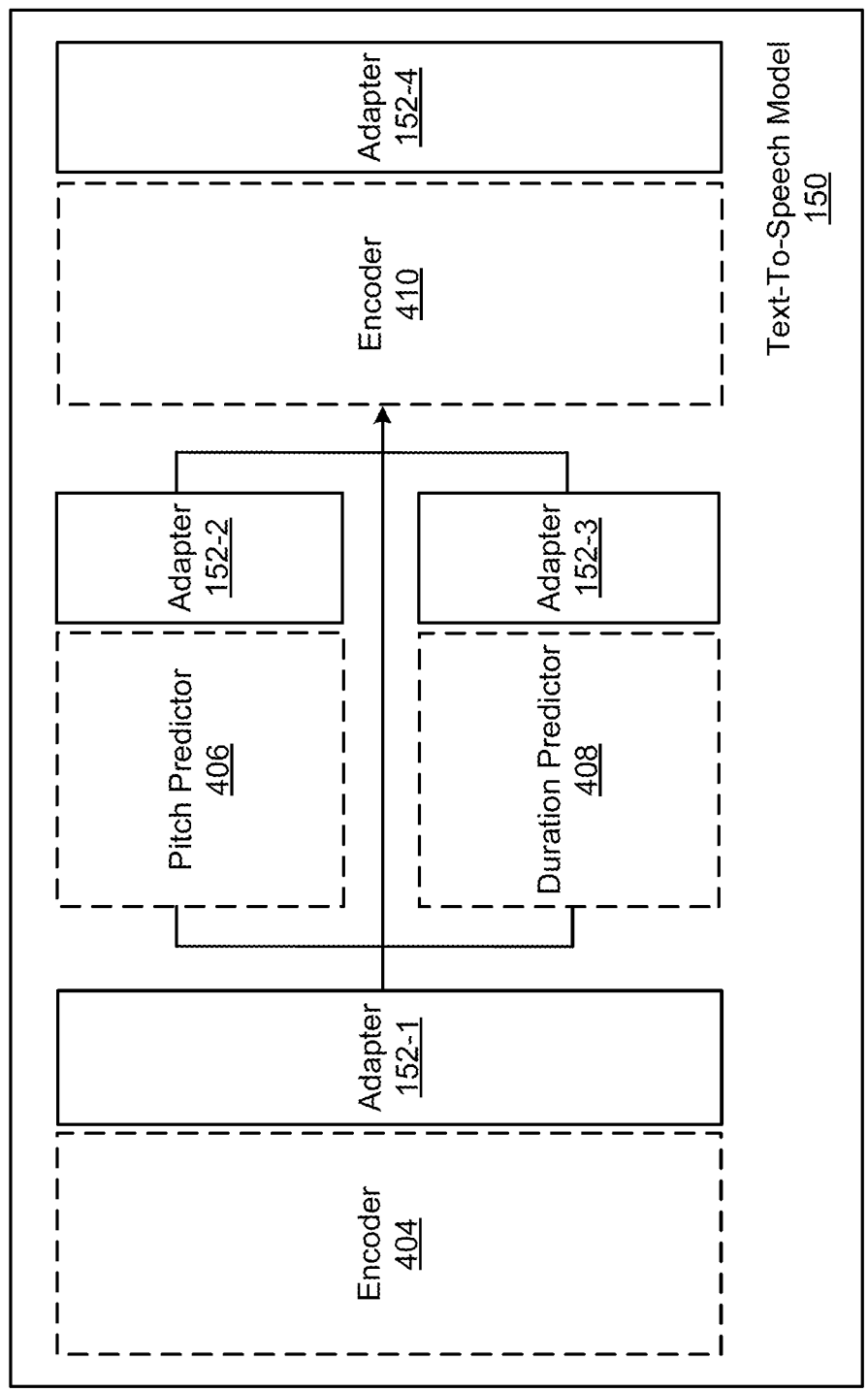
FIG. 5 illustrates an approach for training a text-to-speech machine learning model, according to various embodiments.

FIG. 5 illustrates an approach for training a TTS machine learning model, such as the TTS machine learning model 150 of FIG. 3, according to various embodiments. The training customizes, updates, or adapts the TTS machine learning model 150 for one or more new speakers (which as described can include speakers having distinct identities and/or different emotional states and/or tones), and/or otherwise trains the TTS machine learning model 150 with adapters to generate outputs corresponding to different speakers. than the base or original TTS machine learning model 150 was trained or configured for. During training, in this example, the TTS machine learning model 150 may be trained to generate an output representation (e.g., spectrogram, mel-spectrogram, etc.) representative of speech corresponding to the speaker associated with the speaker embedding 401.

As shown, during the training, parameters of the adapters 152-1, 152-2, 152-3, and 152-4 are updated, while other parameters (e.g., all parameters, some parameters, etc.) of the base TTS machine learning model 150 are fixed. The fixed parameters include parameters of the encoder 404, the pitch predictor 406, the duration predictor 408, and/or the decoder 410, which are shown in ghosted lines. Because only the parameters of the adapters 152-1, 152-2, 152-3, and 152-4 are updated during training, less speech data of the new speaker(s) speaking is required and/or no (or less) speech data corresponding to the original speakers of the model 150 is not required. As a result, the training can be performed using less compute resources and in less time—e.g., relative to conventional approaches that update all parameters of a TTS machine learning model when the TTS machine learning model is re-trained for new speakers. For a non-limiting example, and during experimentation, where the adapters 152-1, 152-2, 152-3, and 152-4 include approximately 10% of the parameters in the rest of the machine learning model 150, updating only the parameters of the adapters 152-1, 152-2, 152-3, and 152-4 can take less than fifteen minutes of training time and use only ten to fifteen minutes of speech data for a new speaker. Fixing the parameters of the TTS machine learning model 150 other than the parameters of the adapters 152-1, 152-2, 152-3, and 152-4 during the training also ensures that the performance of the TTS machine learning model 150 for previous speakers that the TTS machine learning model 150 was trained or configured to generate speech for is not impacted by the training.

In some embodiments, the TTS machine learning model 150 and adapters 152-1, 152-2, 152-3, and 152-5 are trained via a supervised training technique that minimizes a mean squared error loss between spectrograms (or alternative output representations) generated by the TTS machine learning model 150 given phonemes, letters, words, sub words, characters, etc. in a training data set and ground truth spectrograms associated with the same. In some embodiments, any technically feasible training technique can be employed, such as backpropagation with gradient descent or variations thereof. In some embodiments, new speaker embeddings associated with the new speaker(s), such as the speaker embedding 401, are also learned during the training. For example, in some embodiments, new speaker embeddings can include a weighted sum of embeddings associated with previous speakers for which the TTS machine learning model 150 was trained. In some embodiments, the speaker embedding 401 is fixed rather than learned during training. For example, in some embodiments, new speaker embeddings can be the same as a randomly chosen embedding associated with a previous speaker for which the TTS machine learning model 150 was trained.

Subsequent to training, when speech is to be generated for one or more new speakers, the adapters 152-1, 152-2, 152-3, and/or 152-5 can be inserted into the TTS machine learning model 150 that processes portions of the input textual data to generate the speech output representation. In such cases, the textual input and an embedding associated with the new speaker may be input into the TTS machine learning model 150 that includes the adapters 152-1, 152-2, 152-3, and/or 152-5. Given such inputs, the TTS machine learning model 150 generates an output speech representation (e.g., a spectrogram), which can then be converted to an audio signal for output via a speaker device. For example, a vocoder may be used to convert a spectrogram (e.g., mel-spectrogram) to a waveform. To generate speech for additional new speakers after the adapters 152 are trained, another adapter(s) may be added for the one or more additional new speakers, and this process may be repeated for any number of new speakers over time, including speakers having different identities, emotions, and/or tones. In deployment, as described herein, the adapters corresponding to a particular speaker may be activated while adapters corresponding to other speakers may be deactivated. As such, even where a model has multiple sets of adapters, each set of adapters may not be used for any given input; rather, only the adapters that were trained for a current speaker (identified in the identification data) may be activated for processing the current iteration of data.

Figure 6:
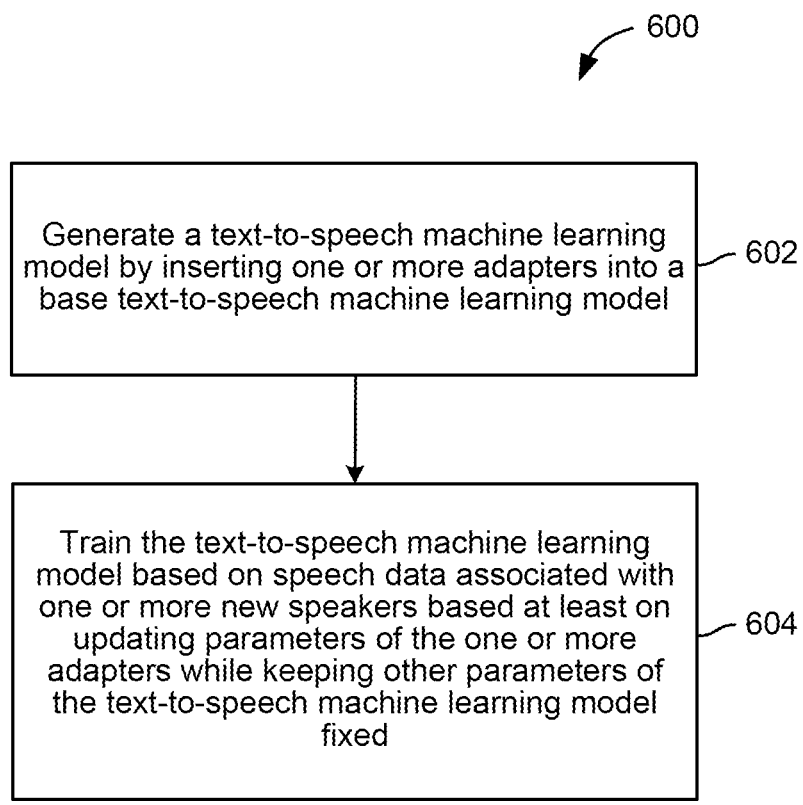
FIG. 6 is a flow diagram of a process for training a text-to-speech machine learning model into which one or more adapters are inserted, according to various embodiments.

FIG. 6 is a flow diagram of a method 600 for training a text-to-speech machine learning model into which one or more adapters are inserted, according to various embodiments. Although the method 600 is described in conjunction with the systems of FIGS. 1-4, persons skilled in the art will understand that any system configured to perform the method 600 in any order falls within the scope of the present embodiments.

As shown, the method 600, at operation 602, includes the model trainer 116 generating a TTS machine learning model 150 by inserting one or more adapters into a base TTS machine learning model. The base TTS machine learning model may have been previously trained to generate speech corresponding to one or more speakers from text (or portions thereof).

At operation 604, the model trainer 116 trains the TTS machine learning model that includes the one or more inserted adapters based on speech data associated with one or more new speakers based at least on updating parameters of the one or more adapters while keeping other parameters of the TTS machine learning model fixed. In some embodiments, the training aims to minimize a mean squared error loss between outputs (e.g., spectrograms) generated using the TTS machine learning model given a portion of input text in a training data set and ground truth outputs associated with the same. In some embodiments, any technically feasible training technique can be employed, such as back-propagation with gradient descent or variations thereof. In some embodiments, a new speaker embedding(s) associated with the one or more new speakers are also learned during the training. For example, in some embodiments, new speaker embeddings can include a weighted sum of embeddings associated with previous speakers for which the TTS machine learning model was trained. In some embodiments, speaker embeddings are fixed rather than learned during training. For example, in some embodiments, new speaker embeddings can include the same as a randomly chosen embedding associated with a previous speaker for which the TTS machine learning model was trained.

Figure 7:
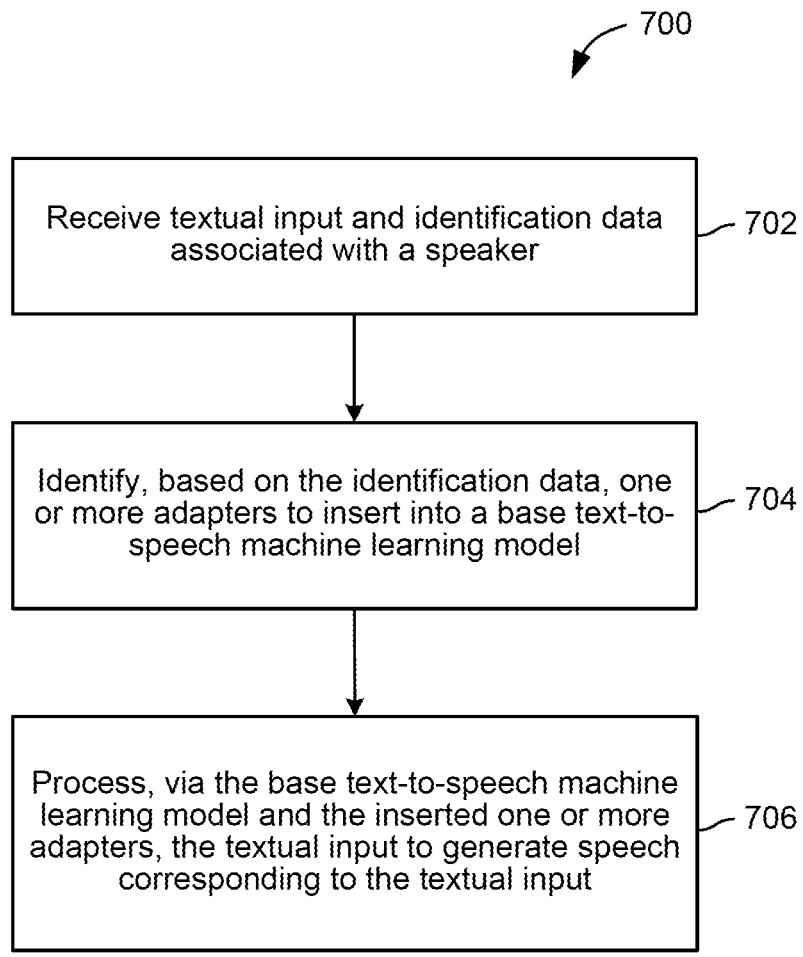
FIG. 7 is a flow diagram of a process for generating text from speech using a text-to-speech machine learning model into which one or more adapters are inserted, according to various embodiments.

FIG. 7 is a flow diagram of a method 700 for generating text from speech using a text-to-speech machine learning model into which one or more adapters are inserted, according to various embodiments. Although the method 700 is described in conjunction with the systems of FIGS. 1-4, persons skilled in the art will understand that any system configured to perform the method 700 in any order falls within the scope of the present embodiments.

As shown, the method 700, at operation 702, includes the application 146 receiving textual input and identification data associated with a speaker. As described, the speaker specified by the identification data can have a different identity than other speakers and/or a different emotional state (e.g., happy, sad, etc.) and/or tone than an existing speaker. In some embodiments, the identification data includes an embedding that represents the speaker. In some other embodiments, the identification data is in a different format (e.g., an identification number), and the application 146 determines an embedding associated with the speaker from the identification data.

At operation 704, the application 146 identifies, based on the identification data, one or more adapters to insert into a base TTS machine learning model, thereby activating the one or more adapters. In some embodiments, the one or more adapters include parameters that are updated during training based on speech data for the speaker associated with the identification data received at operation 702, as described above with respect to at least FIG. 6.

At operation 706, the application 146 processes, via the base TTS machine learning model and the inserted one or more adapters, the textual input to generate speech corresponding to the textual input. In some embodiments, processing the textual input includes performing pre-processing to convert the textual input to a format (e.g., phonemes, characters, words, sub words, etc.) that can be input into the base TTS machine learning model with the inserted one or more adapters. For example, in some embodiments, portions of textual data can be sequentially input, along with an embedding associated with the identification data, into the TTS machine learning model 150. In some embodiments, post-processing is also performed to convert an output audio representation (e.g., spectrograms) of the base TTS machine learning model with the inserted one or more adapters into an audio signal that can be played back via a speaker device, stored, transmitted to another computing device, etc., as described above with respect to at least FIGS. 4-5. For example, a vocoder may be used to convert a spectrogram to a waveform (or other audio signal type) that can be used to generate or output speech.

As such, techniques are disclosed for customizing text-to-speech machine learning models. In some embodiments, one or more adapters are inserted into a TTS machine learning model that was previously trained to generate speech corresponding to one or more speakers. To customize the TTS machine learning model for a new speaker, the TTS machine learning model that includes the one or more adapters is trained using speech data of the new speaker speaking. During the training, parameters of the one or more adapters are updated, while other parameters of the TTS machine learning model are fixed. In some embodiments, an embedding associated with the new speaker is also learned during the training.

Subsequent to training, text and the embedding associated with the new speaker can be processed via the TTS machine learning model, into which the one or more adapters are inserted, to generate speech that can be output via a speaker device, stored, transmitted to another computing device, etc. To generate speech for other speakers, other adapters that are trained using speech data for the other speakers can be inserted into the TTS machine learning model.

At least one technical advantage of the disclosed techniques relative to the conventional solutions is that a TTS machine learning model can be customized for new speakers using less training data, time, and compute resources. For example, experience has shown that the disclosed techniques can be applied to customize a TTS machine learning model in less than fifteen minutes using ten to fifteen minutes of speech data for a new speaker. In addition, by fixing parameters of the TTS machine learning model other than the parameters in one or more adapters during training, the performance of the TTS machine learning model for previous speakers is not impacted by the training—e.g., because the adapters may be deactivated or skipped over during processing of speech data corresponding to the speakers the base model is trained for.

1. In some embodiments, a method comprises determining, based at least on identification data corresponding to a speaker, one or more adapters corresponding to the speaker, and generating a speech representation corresponding to the speaker based at least on processing a textual input using a text-to-speech (TTS) machine learning model and the one or more adapters.

2. The method of clause 1, further comprising activating the one or more adapters based at least on the determining, wherein the TTS machine learning model is trained to output TTS corresponding to one or more other speakers.

3. The method of clauses 1 or 2, further comprising updating one or more first parameters of the one or more adapters using training data corresponding to the speaker during training of the one or more adapters, and maintaining one or more second parameters of one or more layers of the text-to-speech machine learning model not included in the one or more adapters.

4. The method of any of clauses 1-3, wherein the one or more adapters include at least one of a feed-forward adapter, a LoRA (low-rank adaptation) adapter, a prefix tuning adapter, or a self-attention adapter.

5. The method of any of clauses 1-4, further comprising determining, based on second identification data corresponding to a second speaker, that the one or more adapters of the TTS machine learning model are not associated with the second speaker, and generating a second speech representation corresponding to the second speaker based at least on processing a second textual input using the TTS machine learning model and without the one or more adapters.

6. The method of any of clauses 1-5, wherein the speaker has at least one of a different identity, a different tone, a different pitch, a different speech pattern, or a different emotional state than one or more speakers that the TTS machine learning model was trained for.

7. The method of any of clauses 1-6, further comprising generating an audio signal using the speech representation.

8. The method of any of clauses 1-7, wherein the speech representation is further generated based at least on processing, using the TTS machine learning model and the one or more adapters, an embedding associated with the speaker.

9. The method of any of clauses 1-8, wherein the TTS machine learning model further includes one or more second adapters, and the one or more second adapters are deactivated during the processing of the textual input based at least on the one or more second adapters not corresponding to the speaker.

10. In some embodiments, a processor comprises one or more processing units to perform operations comprising receiving an input comprising identification data corresponding to a first speaker, activating, based on identification data corresponding to the first speaker, one or more adapters associated with the first speaker and corresponding to a text-to-speech (TTS) machine learning model, processing one or more first textual inputs using the TTS machine learning model and the one or more adapters, and deactivating the one or more adapters during the processing of one or more second textual inputs corresponding to a second speaker different from the first speaker.

11. The processor of clause 10, wherein the one or more first adapters are included in the TTS machine learning model after at least one of an encoder, a pitch predictor, a duration predictor, or a decoder of the text-to-speech machine learning model.

12. The processor of clauses 10 or 11, wherein, during training of the one or more adapters one or more first parameters of the one or more adapters are updated using training data corresponding to the first speaker, and one or more second parameters of one or more layers of the text-to-speech machine learning model not included in the one or more adapters remain fixed.

13. The processor of any of clauses 10-12, wherein an output of the processing of the one or more textual inputs includes a spectrogram, and the operations further comprise using a vocoder to generate a waveform corresponding to the spectrogram.

14. The processor of any of clauses 10-13, wherein the one or more adapters include at least one of a feed-forward adapter, a LoRA (low-rank adaptation) adapter, a prefix tuning adapter, or a self-attention adapter.

15. The processor of any of clauses 10-14, wherein the operations further include causing output of an audio signal corresponding to a speech representation generated as an output of the processing of the one or more textual inputs.

16. The processor of any of clauses 10-15, wherein the processor is comprised in at least one of an infotainment system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for generating or presenting virtual reality, augmented reality, or mixed reality content, a system for performing conversational AI operations, a system for generating synthetic data, a system incorporating one or more virtual machines (VMs), a system implemented at least partially in a data center, or a system implemented at least partially using cloud computing resources.

17. In some embodiments, a system comprises one or more processing units to generate an audio signal corresponding to a speaker based at least on a textual input, the audio signal being generated using an output of a machine learning model that includes one or more adapter layers associated with the speaker.

18. The system of clause 17, wherein one or more first parameters of one or more layers of the machine learning model are updated using first training data corresponding to one or more first speakers, and one or more second parameters of the one or more adapter layers are updated using second training data corresponding to the speaker, wherein the one or more first parameters are fixed during updating of the one or more second parameters.

19. The system of clauses 17 or 18, wherein the one or more processing units are further to generate a second audio signal corresponding to a second speaker based at least on a second textual input, wherein the second audio signal is generated using an output of the machine learning model, the output being created while the one or more adapter layers associated with the speaker are deactivated.

20. The system of any of clauses 17-19, wherein the system comprises at least one of an infotainment system for an autonomous or semi-autonomous machine, a system for performing simulation operations, a system for performing digital twin operations, a system for performing light transport simulation, a system for performing collaborative content creation for 3D assets, a system for performing deep learning operations, a system implemented using an edge device, a system implemented using a robot, a system for generating or presenting virtual reality, augmented reality, or mixed reality content, a system for performing conversational AI operations, a system for generating synthetic data, a system incorporating one or more virtual machines (VMs), a system implemented at least partially in a data center, or a system implemented at least partially using cloud computing resources.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    determining, based at least on identification data corresponding to a speaker, an identity embedding associated with the speaker;
    activating, based at least on the identity embedding, one or more adapters, from a plurality of adapters included in a text-to-speech (TTS) machine learning model, that correspond to the speaker, wherein each of the plurality of adapters is trained using speaker-specific training data separately from fixed components of the TTS machine learning model;
    processing, using the TTS machine learning model including the one or more activated adapters, a textual input to generating a speech representation corresponding to the speaker; and
    causing output of audio corresponding to the speech representation.

2. The method of claim 1, wherein the TTS machine learning model is trained to output TTS corresponding to one or more other speakers.

3. The method of claim 1, further comprising:
    updating one or more first parameters of the one or more adapters using training data corresponding to the speaker during training of the one or more adapters; and
    maintaining one or more second parameters of one or more layers of the text-to-speech machine learning model not included in the one or more adapters.

4. The method of claim 1, wherein the one or more adapters include at least one of a feed-forward adapter, a LoRA (low-rank adaptation) adapter, a prefix tuning adapter, or a self-attention adapter.

5. The method of claim 1, further comprising:
    determining, based on second identification data corresponding to a second speaker, that the one or more adapters of the TTS machine learning model are not associated with the second speaker; and
    generating a second speech representation corresponding to the second speaker based at least on processing a second textual input using the TTS machine learning model and without the one or more adapters.

6. The method of claim 1, wherein the speaker has at least one of a different identity, a different tone, a different pitch, a different speech pattern, or a different emotional state than one or more speakers that the TTS machine learning model was trained for.

7. The method of claim 1, further comprising generating an audio signal using the speech representation.

8. The method of claim 1, wherein the TTS machine learning model further includes one or more second adapters, and the one or more second adapters are deactivated during the processing of the textual input based at least on the one or more second adapters not corresponding to the speaker.

9. A processor comprising:
one or more processing units to perform operations comprising:
receiving an input comprising identification data corresponding to a first speaker;
determining, based at least on the identification data, an identity embedding associated with the speaker;
activating, based at least on the identity embedding, one or more adapters, from a plurality of adapters included in a text-to-speech (TTS) machine learning model, that correspond to the speaker, wherein each of the plurality of adapters is trained using speaker-specific training data separately from fixed components of the TTS machine learning model;
processing, using the TTS machine learning model including the one or more activated adapters, one or more first textual inputs to generate a speech representation corresponding to the speaker, wherein the TTS machine learning model, without activation of the one or more adapters, is unable to produce speech representations corresponding to the speaker; and
deactivating the one or more adapters during the processing of one or more second textual inputs corresponding to a second speaker different from the first speaker.

10. The processor of claim 9, wherein the one or more first adapters are included in the TTS machine learning model after at least one of an encoder, a pitch predictor, a duration predictor, or a decoder of the text-to-speech machine learning model.

11. The processor of claim 9, wherein, during training of the one or more adapters:
one or more first parameters of the one or more adapters are updated using training data corresponding to the first speaker; and
one or more second parameters of one or more layers of the text-to-speech machine learning model not included in the one or more adapters remain fixed.

12. The processor of claim 9, wherein an output of the processing of the one or more textual inputs includes a spectrogram, and the operations further comprise using a vocoder to generate a waveform corresponding to the spectrogram.

13. The processor of claim 9, wherein the one or more adapters include at least one of a feed-forward adapter, a LoRA (low-rank adaptation) adapter, a prefix tuning adapter, or a self-attention adapter.

14. The processor of claim 9, wherein the operations further include causing output of an audio signal corresponding to a speech representation generated as an output of the processing of the one or more textual inputs.

15. The processor of claim 9, wherein the processor is comprised in at least one of:
an infotainment system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for generating or presenting virtual reality, augmented reality, or mixed reality content;
a system for performing conversational AI operations;
a system for generating synthetic data;
a system incorporating one or more virtual machines (VMs);
a system implemented at least partially in a data center; or
a system implemented at least partially using cloud computing resources.

16. A system comprising:
one or more processing units to:
determine, based at least on identification data corresponding to a speaker, an identity embedding associated with the speaker;
activate, based at least on the identity embedding, one or more adapters, from a plurality of adapters included in a text-to-speech (TTS) machine learning model, that correspond to the speaker, wherein each of the plurality of adapters is trained using speaker-specific training data separately from fixed components of the TTS machine learning model;
processing, using the TTS machine learning model including the one or more activated adapters, a textual input to generate a speech representation corresponding to the speaker, wherein the TTS machine learning model, without activation of the one or more adapters, is unable to produce speech representations corresponding to the speaker; and
cause output of audio corresponding to the speech representation.

17. The system of claim 16, wherein one or more first parameters of one or more layers of the machine learning model are updated using first training data corresponding to one or more first speakers, and one or more second parameters of the one or more adapter are updated using second training data corresponding to the speaker, wherein the one or more first parameters are fixed during updating of the one or more second parameters.

18. The system of claim 16, wherein the one or more processing units further generate a second audio corresponding to a second speaker based at least on a second textual input, wherein the second audio signal is generated using an output of the machine learning model, the output being created while the one or more adapter layers associated with the speaker are deactivated.

19. The system of claim 16, wherein the system comprises at least one of:
an infotainment system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for generating or presenting virtual reality, augmented reality, or mixed reality content;
a system for performing conversational AI operations;

a system for generating synthetic data;
a system incorporating one or more virtual machines (VMs);
a system implemented at least partially in a data center; or
a system implemented at least partially using cloud computing resources.

\* \* \* \* \*

UNITED STATES PATENT AND TRADEMARK OFFICE
CERTIFICATE OF CORRECTION

| | | |
|---|---|---|
| PATENT NO. | : 12,406,653 B2 | Page 1 of 1 |
| APPLICATION NO. | : 17/965708 | |
| DATED | : September 2, 2025 | |
| INVENTOR(S) | : Cheng-Ping Hsieh et al. | |

It is certified that error appears in the above-identified patent and that said Letters Patent is hereby corrected as shown below:

In the Claims

In Column 18, Line 38, in Claim 1, delete "generating" and insert -- generate --.

Signed and Sealed this
Fourth Day of November, 2025

John A. Squires
*Director of the United States Patent and Trademark Office*